July 31, 1956   D. A. RADER   2,756,957

SUPPORT ASSEMBLY

Filed March 30, 1953

INVENTOR.
DONALD A. RADER
BY
ATTORNEYS

2,756,957

SUPPORT ASSEMBLY

Donald A. Rader, Inglewood, Calif., assignor, by mesne assignments, to the United States of America as represented by the Secretary of the Navy Application March 30, 1953, Serial No. 345,291

1 Claim. (Cl. 248—185)

The present invention relates to a support assembly and more particularly to a support assembly having a selectively operable locking means which utilizes an eccentric arrangement to securely clamp a supported member in the assembly.

The present invention is adapted to support any type of cylindrical member and is particularly adapted to support the trunnions of cameras. For example, conventional aerial cameras have trunnions extending from opposite sides thereof which are mounted in suitable support assemblies. To obtain satisfactory results when using such cameras, it is necessary that the camera be rigidly mounted so as to prevent undesirable movement thereof, and therefore it is essential that the trunnions be firmly supported so as to eliminate relative movement between the trunnions and support assemblies. This is accomplished in the invention device by providing a locking member having a portion which is eccentric to certain other parts of the assembly enabling the supported trunnions to be securely clamped between various components of the assembly thereby eliminating objectionable movements of the camera. Furthermore, since such cameras are frequently mounted upon and removed from the support assemblies, it is desirable to provide an assembly which is simple in operation and requires a minimum of time to be actuated. The present invention merely requires the rotation of a single member to lock a trunnion securely within the support assembly, thereby providing a simple and efficient means of securing the device in operative position.

An object of the present invention is the provision of a new and novel support assembly which prevents relative movement between a supported member and the support assembly.

Another object is to provide a support assembly which may be quickly and easily operated.

A further object of the invention is the provision of a support assembly which does not require close tolerance machine work in the manufacture thereof.

Still another object is to provide a support assembly which is simple in construction and employs a minimum of parts, yet is sturdy and reliable in operation.

Other objects and many of the attendant advantages of this invention will be readily appreciated as the same becomes better understood by reference to the following detailed description when considered in connection with the accompanying drawings wherein.

Figure 1:
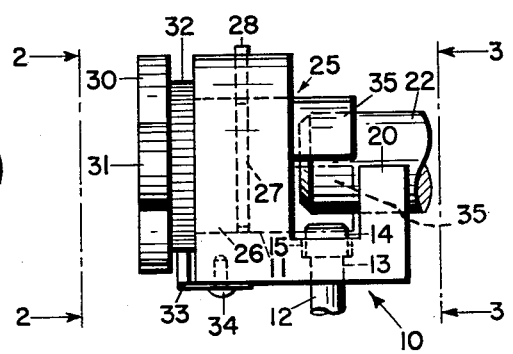
Fig. 1 is a front elevation of a preferred embodiment of the invention.

Referring now to the drawing wherein like reference characters designate like or corresponding parts throughout the several views, there is shown in Fig. 1 a body member 10 having a cylindrical opening 11 extending longitudinally therethrough. The body member is rigidly mounted upon a suitable supporting structure by means of bolts 12, which pass through openings 13 in the body member, and the heads 14 of the bolts are seated in recesses 15 formed in the body member.

Figure 3:
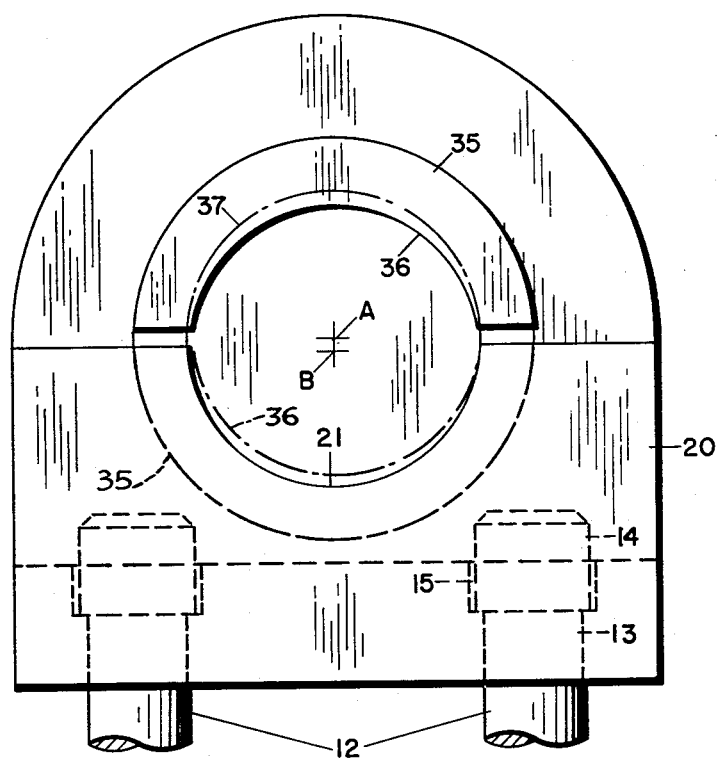
Fig. 3 illustrates an enlarged view taken on a line 3—3 of Fig. 1, looking in the direction of the arrows, with certain parts removed.

As may be most clearly seen in Figs. 1 and 3, an end portion 20 of the body member has an arcuate seat 21 formed therein which is adapted to receive a cylindrical trunnion or lug member 22. Seat 21 defines a substantially semi-circular surface the radius of which corresponds to the radius of the cylindrical trunnion member which it supports, whereby the outer periphery of trunnion 22 and the inner periphery of seat 21 comprise complementary surfaces such that the trunnion will fit snugly within the seat.

Referring again to Fig. 1, a locking member indicated generally by reference numeral 25 has a cylindrical portion 26 which is rotatably journaled within the opening 11 in the body member in axial alignment with trunnion 22. Portion 26 has a circumferential groove 27 formed in the outer periphery thereof, and a pin 28 which is suitably mounted in the body member extends into the groove, thereby preventing axial movement between members 10 and 25.

Figure 2:
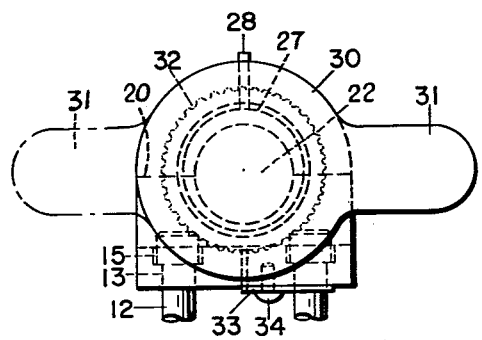
Fig. 2 shows a view taken on a line 2—2 of Fig. 1 looking in the direction of the arrows.

As may be more clearly seen in Fig. 2, an end portion 30 of member 25 has a handle 31 formed integral therewith which may be manually grasped when it is desired to rotate member 25 with respect to member 10. Member 25 also has a serrated portion 32 extending circumferentially around the outer periphery thereof, and the serrations are engaged by a leaf spring detent 33 which is suitably mounted as by means of a bolt 34 to member 10. The detent serves to prevent relative rotation between members 25 and 10 and may be manually disengaged from the serrated portion when it is desired to rotate member 25.

Referring to Figs. 1 and 3, member 25 has an arcuate end portion 35 formed integral therewith and extending through an arc of approximately 180 degrees. The inner surface 36 of member 35 is adapted to engage the outer surface of the supported trunnion 22 and as may be more clearly seen in Fig. 3, this surface is substantially semi-circular in shape and its center of curvature is located at the point "B". Phantom line 37 indicates the position of the trunnion 22 when it is resting in seat 21 and the portion 35 is not in engagement therewith. It should be noted that the supported trunnion is cylindrical in shape having its center located at point "A" which is also the center of rotation of portion 35. It is therefore evident that the inner surface 36 is eccentric to the outer surface of the trunnion 22 when the trunnion is resting in seat 21. The amount of eccentricity between members 22 and 35, or the distance between points "A" and "B", may be in the order of 1/32 inch when a trunnion having a diameter of 3/4 inch is utilized. The amount of eccentricity may vary slightly without impairing the proper operation of the present invention, and therefore, it is not necessary to employ close tolerance machine work in manufacturing the device.

The operation of the device is as follows: When the end portion 35 and the handle 31 are in the phantom line positions as shown in Figs. 1 and 2, respectively, the support assembly is in the unlocked position. A cylindrical trunnion is then positioned within seat 21 as shown in Fig. 1, being initially spaced therefrom by the eccentricity of inner surface 26, and detent 33 is manually removed from serrated portion 32. Handle 31 is then rotated 180 degrees from the phantom line position to the full line position in Fig. 2, thereby rotating member 25 and end portion 35 from the phantom line position to the full line position in Fig. 1. Since surface 36 is eccentric to the outer surface of the trunnion, surface 36 will tend to cam the trunnion downward as the end portion 35 is rotated from the phantom line position shown in Fig. 1, to the full line position shown in Figs. 1 and 3. This camming action serves to clamp the trunnion tightly between portion 35 and seat 21, thereby securely clamping the trunnion in the desired position. Any tendency of portion 35 to turn the trunnion during the locking operation can be easily nullified by simply holding by hand or any suitable clamping arrangement the part to be locked in place against the frictional torque load. When member 25 has been rotated to the desired position, detent 33 is again engaged with serrations 32, and the trunnion will remain securely locked in supported position until the detent is once again disengaged from the serrations and member 35 rotated out of locking position.

From the foregoing, it is evident that there is provided a new and novel support assembly which prevents relative movement between the supported member and the support assembly, and which may be quickly and easily operated. The invention device does not require close tolerance machine work in its manufacture, and the device is simple in construction and employs a minimum of parts, yet is sturdy and reliable in operation.

Obviously many modifications and variations of the present invention are possible in the light of the above teachings. It is therefore to be understood that within the scope of the appended claims the invention may be practiced otherwise than as specifically described.

What is claimed is:

A support assembly which comprises a body member having a longitudinally extending cylindrical opening, said body member having a longitudinally extending portion formed with a first substantially semi-cylindrical seat surface having a radius of curvature corresponding to the radius of curvature of a cylindrical member to be supported thereon at an intermediate portion, a locking member having a cylindrical portion rotatably supported within the cylindrical opening of the body member, said locking member having a longitudinal extending portion formed with a second substantially semi-cylindrical surface having a radius of curvature corresponding to the radius of said first surface and adapted to engage an end portion of the cylindrical member, means for rotating said locking member substantially 180 degrees from an unlocked position wherein said first and second cylindrical surfaces are in the same relative position capable of receiving the cylindrical member seated in a direction normal to the surfaces to a locked position where said surfaces are disposed in complementary relation adapted to clamp the cylindrical member therebetween, a center of curvature of said second surface being offset with respect to a center of curvature of said first surface to cause a displacement of said second surface above the first surface when the surfaces are in an unlocked position, whereby rotation of said locking member to the locked position will provide a camming action of the second surface on said end portion of the cylindrical member and result in a bending moment thereon to the extent of said displacement to clamp the cylindrical member between the surfaces.

References Cited in the file of this patent

UNITED STATES PATENTS

| | | |
|---|---|---|
| 843,906 | Murchie | Feb. 12, 1907 |
| 1,417,652 | Wood | May 30, 1922 |
| 1,460,344 | Kager | June 26, 1923 |
| 1,559,453 | Printer et al. | Oct. 27, 1925 |
| 2,655,822 | Klavon | Oct. 30, 1953 |

FOREIGN PATENTS

| | | |
|---|---|---|
| 20,204 | Great Britain | Sept. 11, 1906 |